Feb. 1, 1955
E. J. RICKNER
2,700,901
LIQUID LEVEL MEASURING APPARATUS
Filed May 2, 1952
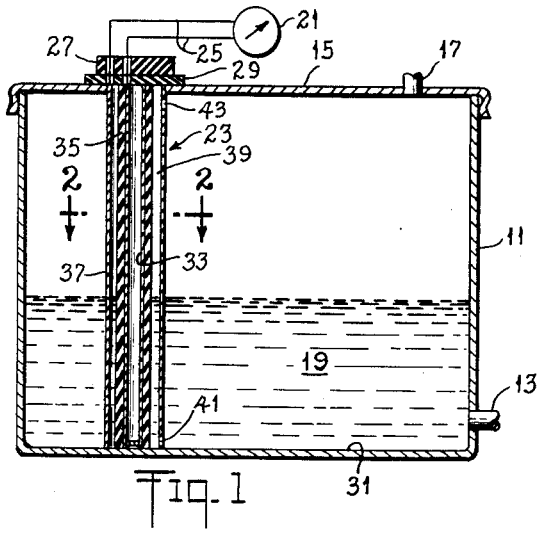
Fig. 1
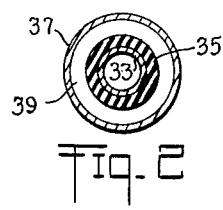
Fig. 2
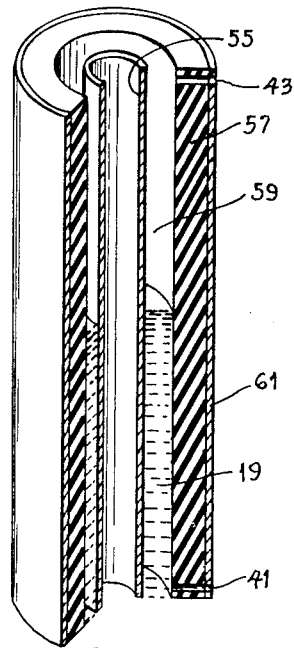
Fig. 4
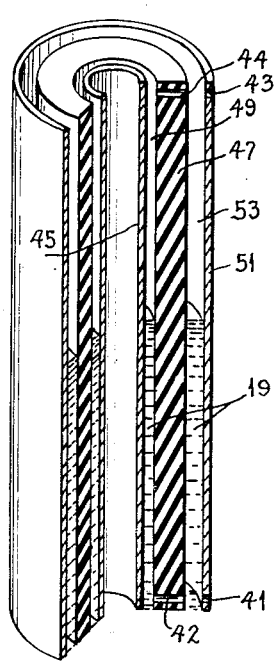
Fig. 3
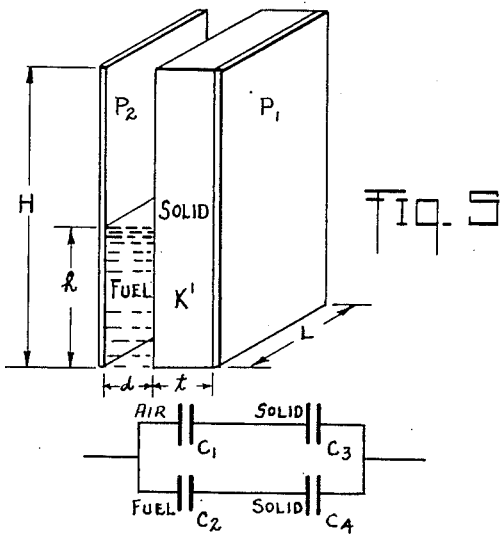
Fig. 5
Fig. 6
INVENTOR.
EDWARD J. RICKNER
BY
D. C. Snyder
Roderick B. Jones
ATTORNEYS

United States Patent Office 2,700,901
Patented Feb. 1, 1955

2,700,901

LIQUID LEVEL MEASURING APPARATUS

Edward J. Rickner, Glenside, Pa.

Application May 2, 1952, Serial No. 285,784

2 Claims. (Cl. 73—304)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in liquid level measuring apparatus, and more particularly pertains to improvements in means for compensating capacitor-type fuel-quantity gages.

Capacitor-type fuel-quantity gages heretofore developed are subject to serious errors in indication resulting from variations in fuel characteristics. Particularly since the introduction of jet fuels for aircraft, variations in the capacity index up to 15 per cent have been found. These variations constitute excessive gage errors and therefore demand the provision of some sort of compensation.

Gage compensating means to reduce the error resulting from variations in the capacity index of fuels heretofore have taken the form of an auxiliary unit placed in the bottom of the fuel tank or in the fuel feed line, in addition to major changes in or additions to the basic uncompensated gage circuit. This has the further disadvantage of requiring an additional port in the fuel tank or additional piping in the feed line.

The subject device solves the problem of compensation by providing a dielectric material of proper thickness and dielectric constant between the sensing elements of the tank unit in such a manner that some or all of the electric lines of force between such elements pass through the dielectric material and through the fuel or air.

The principal object of this invention is to provide simple, inexpensive and accurate means to compensate capacitor-type fuel-quantity gages for errors in indication resulting from variations in fuel characteristics.

Other objects and many of the attendant advantages of this invention will be readily appreciated as the same becomes better understood by reference to the following detailed description when considered in connection with the accompanying drawings wherein:

Fig. 1 is a sectional elevation of a fuel tank having a compensated tank unit for a capacitor-type fuel quantity gage, said gage being illustrated diagrammatically, showing a preferred embodiment of the invention;

Fig. 2 is an enlarged section taken on the line 2—2 of Fig. 1.

Fig. 3 is a fragmentary sectional perspective view of a portion of a compensated tank unit of the character described, showing a modified form of the invention;

Fig. 4 is a fragmentary sectional perspective view of a portion of a compensated tank unit of the character described, showing another modified form of the invention;

Fig. 5 is a diagram showing the mode of operation of the device; and

Fig. 6 is a circuit diagram further showing the mode of operation of the device.

Similar numerals refer to similar parts throughout the several views.

Apart from errors due to the shape of the fuel tank, the indication of a capacitor-type fuel-quantity gage, for any given mass of fuel, is proportional to the capacity index of the fuel. The capacity index is defined as $$\frac{(K-1)}{D}$$

where K is the dielectric constant of the fuel and D is the density of the fuel. In other words, the increase in capacitance over the dry or empty tank capacitance of the conventional tank unit is proportional to the mass of fuel in the tank and to said quantity $$\frac{(K-1)}{D}$$

Since it is the variation in $$\frac{(K-1)}{D}$$

from one sample of fuel to another that gives rise to large errors in capacitor-type fuel quantity gages, the subject device is directed to the provision of means to compensate for such variation, based on the assumed relation between $$\frac{(K-1)}{D}$$

and $(K-1)$ of $$\frac{(K-1)}{D} = A(K-1) + B \qquad (1)$$

where A and B are constants. While no single-valued relation exists between these quantities, if the constants A and B are chosen properly, the variation in $$\frac{\frac{(K-1)}{D}}{A(K-1)+B}$$

is far less than the variation in $$\frac{(K-1)}{D}$$

It can be proven mathematically that the desired compensation can be obtained by the insertion of a single piece of dielectric material of predetermined characteristics so that all of the lines of force that pass through the fuel or air in the sensing region also pass through the inserted dielectric material in series. Considering the simpler case of a parallel plate configuration as shown in Fig. 5, a slab of dielectric material of thickness $t$ and dielectric constant $K'$ is placed between two sensing plates $P_1$ and $P_2$. The plates are immersed to a depth $h$ in fuel having a dielectric constant K. This arrangement is equivalent to a series-parallel arrangement of four capacitors, as shown in Fig. 6, and the overall capacitance of the combination is $$C = \frac{1}{\frac{1}{C_1}+\frac{1}{C_3}} + \frac{1}{\frac{1}{C_2}+\frac{1}{C_4}} \qquad (2)$$

where C is the overall capacitance, $C_1$ the capacitance of the dry-volume portion, $C_2$ the capacitance of the fuel-volume portion, and $C_3$ and $C_4$ the capacitances of the solid portions, all as shown in Fig. 5.

The capacitance of a parallel-plate condenser can be expressed as $$\frac{KA}{4\pi s}$$

where K is the dielectric constant of the material between the plates, A is the area of the plates and $s$ is the distance of separation of the plates. When the appropriate values of K, A and $s$, as indicated in Fig. 5, are substituted, the capacitances $C_1$, $C_2$, $C_3$ and $C_4$ become:

$$C_1 = \frac{L(H-h)}{4\pi d} \qquad (3)$$

$$C_2 = \frac{KLh}{4\pi d} \qquad (4)$$

$$C_3 = \frac{K'L(H-h)}{4\pi t} \qquad (5)$$

$$C_4 = \frac{K'Lh}{4\pi t} \qquad (6)$$

Substitution of these results in Equation 2 yields $$C = \frac{L}{4\pi}\left[\frac{(H-h)}{d+\frac{t}{K'}} + \frac{h}{\frac{d}{K}+\frac{t}{K'}}\right] \quad (7)$$

or $$C = \frac{L}{4\pi\left(d+\frac{t}{K'}\right)}\left[H + h\frac{(K-1)}{1+\frac{t}{K'd}K}\right] \quad (8)$$

When the tank is empty, $h=0$ and the dry capacitance, $C_0$, can be expressed $$C_0 = \frac{LH}{4\pi\left(d+\frac{t}{K'}\right)} \quad (9)$$

Hence the increase over dry capacitance is $$C - C_0 = \frac{L}{4\pi\left(d+\frac{t}{K'}\right)} h \frac{(K-1)}{1+\frac{t}{K'd}K} \quad (10)$$

The mass of the fuel in the tank is $$m = ShD \quad (11)$$

where S is the cross-section of the tank and D is the density of the fuel. Hence the increase over dry capacitance can be expressed $$C - C_0 = km\frac{\frac{(K-1)}{D}}{A(K-1)+B} \quad (13)$$

where $$k = \frac{L}{4\pi\left(d+\frac{t}{K'}\right)} \quad (14)$$

$$A = \frac{t}{K'd} \quad (15)$$

$$B = 1 + \frac{t}{K'd} \quad (16)$$

Thus the increase over dry capacitance for a constant mass of fuel is proportional to $$\frac{\frac{(K-1)}{D}}{A(K-1)+B}$$

and is the basis for producing the desired compensation.

A typical embodiment of the invention, shown in Figs. 1 and 2, comprises a fuel tank 11 having an outlet port 13 and a cover member 15 having an inlet port 17, said tank being adapted to carry a fuel 19. Capacitor-type fuel-quantity gage 21 is coupled to the compensator unit 23 by conductors 25, which are led to terminal box 27 secured on mounting flange 29.

The compensator unit 23 comprises a plurality of coaxial tubular members secured to and depending from said flange 29, and extending substantially to the floor 31 of said tank. Said members are a first sensing element 33, a dielectric material element 35 encasing said element 33, and a second sensing element 37 encasing the elements 33 and 35, and spaced from the element 35 by an air gap 39. The second sensing element 37 is provided with a port 41 near its lower end and a vent 43 near its upper end to assure that the level of fuel in said air gap 39 remains substantially the same as the level of fuel in the tank 11. Said sensing elements 33 and 37 are coupled to the conductors 25 to complete the electrical circuit of the gage.

Upon determining the values of A and B in view of the physical dimensions of the tank unit and the dielectric constant of the solid dielectric, the indicator reading will be more nearly proportional to the mass of the fuel in the compensated tank unit than in the uncompensated tank unit.

Alternatively, the compensator elements shown in Fig. 3 can be employed. In lieu of the members 33, 35 and 37, the unit can comprise a first tubular sensing element 45, a dielectric material tube 47 encasing said element 45 coaxially and spaced therefrom by an air gap 49, and a second tubular sensing element 51 encasing said tube 47 coaxially and spaced therefrom by an air gap 53. Suitable ports 41 and 42, and vents 43 and 44 can be provided to assure that the level of fuel in the air gaps 49 and 53 remains substantially the same as the level of fuel in the tank 11. A further modified form of the invention shown in Fig. 4 comprises a first tubular sensing element 55, a dielectric material tube 57 encasing said element 55 coaxially and spaced therefrom by an air gap 59, and a second tubular sensing element 61 encasing said tube 57. Ports 41 and vents 43 can be provided as in the forms of the device shown in Figs. 1 and 3.

It is apparent from the foregoing description that the subject device provides a compensated tank unit adapted to be used with a capacitor-type fuel-quantity gage, so that the indicator can be calibrated to read accurately the mass of the fuel, as distinguished from gages reading fuel level and thus subject to series error in interpretation of mass by reason of differences in density between fuels. The calibration of the indicator will be correct without making adjustments in the gage circuit even though fuels of widely different density and dielectric constant characteristics are used. Having determined the constants A and B by measurement of the dielectric constant of the fuel and the density of the fuel, accurate reading of the mass of the fuel can be obtained by means of the subject device.

Obviously many modifications and variations of the present invention are possible in the light of the above teachings. It is therefore to be understood that within the scope of the appended claims the invention may be practiced otherwise than as specifically described.

I claim:

1. In a capacitor-type fuel quantity gage for a fuel tank, a compensating unit comprising a first cylindrical conductive sensing element, a second cylindrical conductive sensing element, a cylindrical dielectric material element positioned between said sensing elements, said dielectric material having a thickness bearing a predetermined relation to the dielectric constant of said dielectric, the physical and electrical properties of the fuel to be gaged and the volume of such tank, said elements extending coaxially substantially the entire height of such tank, said dielectric material element and each of said sensing elements defining an air gap, means to retain fuel in each of said air gaps at substantially the level of fuel in such tank, and means coupling the capacitance between the first and second sensing elements into the electrical circuit of such gage.

2. In a capacitor-type fuel quantity gage for a fuel tank, a compensating unit comprising a first cylindrical conductive sensing element, a second cylindrical conductive sensing element, a cylindrical dielectric material element positioned between said sensing elements, said elements extending coaxially substantially the entire height of such tank, said dielectric material element and one of said sensing elements defining an air gap, and said unit providing the relationship between the increase over dry capacitance and the mass of fuel such that the increase over dry capacitance is proportional to the product of the mass of fuel and the term $$\frac{\frac{(K-1)}{D}}{A(K-1)+B}$$

where K is the dielectric constant of the fuel, D is the density of the fuel, and A and B are constants determined by the physical dimensions of the compensating unit and the dielectric constant of the dielectric material element, means to retain fuel in said air gap at substantially the level of fuel in such tank, and means coupling the capacitance between the first and second sensing elements into the electrical circuit of such gage.

References Cited in the file of this patent

UNITED STATES PATENTS

| | | |
|---|---|---|
| 2,354,945 | Cohen et al. | Aug. 1, 1944 |
| 2,354,964 | Ostermann et al. | Aug. 1, 1944 |
| 2,375,084 | Coroniti et al. | May 1, 1945 |
| 2,485,579 | Elliott | Oct. 25, 1949 |

FOREIGN PATENTS

| | | |
|---|---|---|
| 121,163 | Australia | Mar. 7, 1946 |